Nov. 14, 1933.   J. H. CHAMBERS   1,935,018
CHANGE SPEED GEARING
Filed May 6, 1933   2 Sheets-Sheet 1
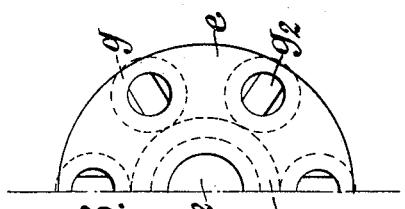
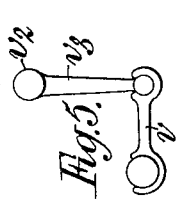
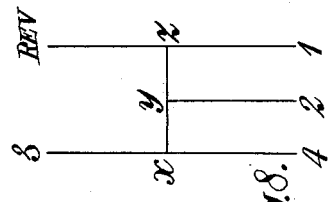
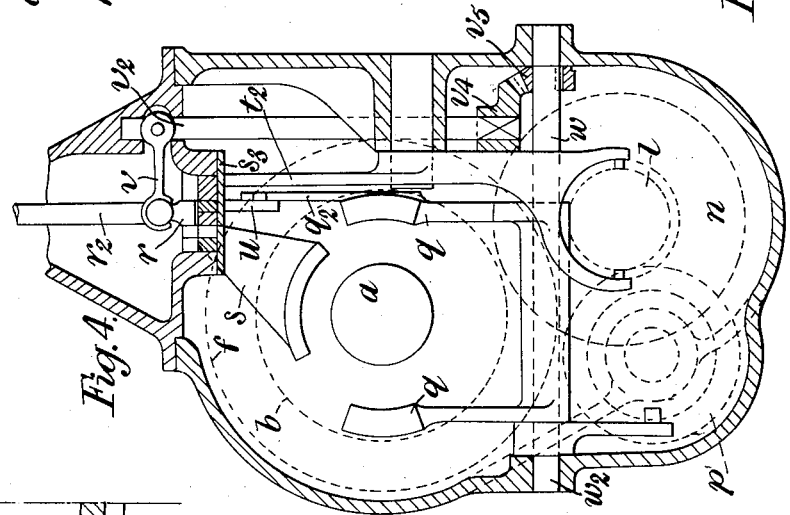
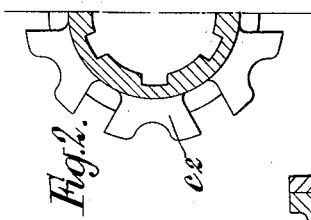
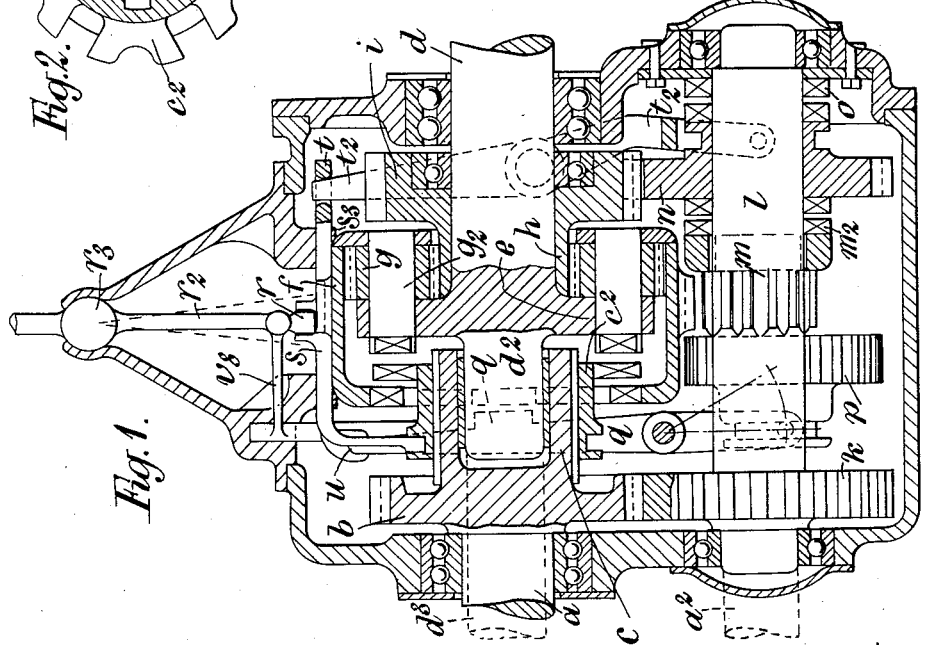
J. H. Chambers
INVENTOR
By: Marks & Clark Attys.

Nov. 14, 1933. J. H. CHAMBERS 1,935,018
CHANGE SPEED GEARING
Filed May 6, 1933   2 Sheets-Sheet 2

J. H. Chambers
INVENTOR
B: Marks & Clerk
ATTY

Patented Nov. 14, 1933

1,935,018

UNITED STATES PATENT OFFICE 1,935,018

CHANGE SPEED GEARING

John Henry Chambers, Belfast, Northern Ireland

Application May 6, 1933, Serial No. 669,783, and in Great Britain October 10, 1931

6 Claims. (Cl. 74—34)

This invention relates to a change speed gear of the type in which an epicyclic train of gears is employed, and comprises also a driving shaft, a driven shaft, and suitable clutches for securing the speed changes and their operation.

The object of the present invention is to devise improvements in this type of gear to secure compactness, to simplify the construction and arrangement of gears, and to make the operation of the gears easy and assure that the power used is advantageously applied.

To this end the invention consists in a change speed gear having the features hereinafter described with reference to the drawings and claimed in the appended claims.

Referring to the accompanying drawings which illustrate two embodiments of the invention by way of example:—

Fig. 1 is a section of the gear box.

Fig. 2 shows one of the clutch members.

Fig. 3 is an end view of the epicyclic cage or carrier.

Fig. 4 is a diagrammatic cross section of the gear box with gearing removed.

Figs. 5, 6 and 7 illustrate details of the control mechanism, and

Fig. 8 is a diagram illustrating the movements of this control mechanism.

Figure 9:
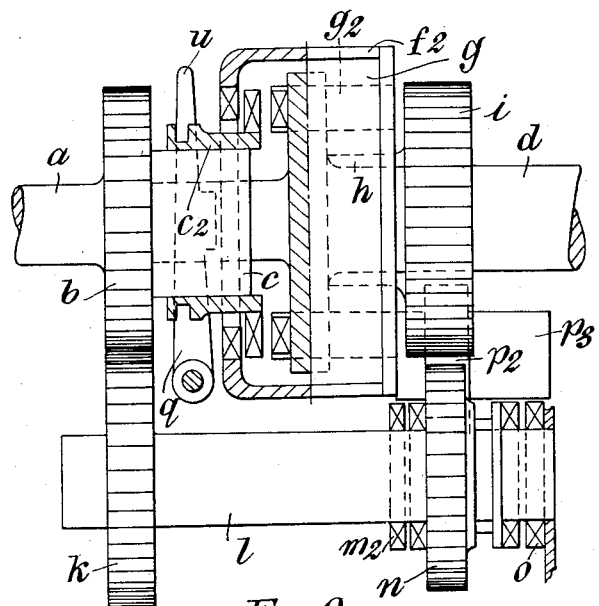
Fig. 9 is a sectional view similar to Fig. 2, showing a modification of the invention.

Referring to Fig. 1, $a$ is the driving shaft with gear wheel $b$ and extension $c$, splines are formed on $c$ on which the half dog clutch $c^2$ is free to slide, $d$ is the driven shaft with extension $d^2$ which is free to revolve in $c$. A flange $e$ which forms the cage or carrier for the planetary gear is formed on $d$, $f$ is the outer or ring member, $g$ the planets, free to revolve on fixed pins $g^2$, and $h$ is the sun-wheel with attached gear wheel $i$. The fixed pins $g^2$ are well secured in the flange $e$ and are extended beyond the flange as shown; they have flattened ends and form part of the dog clutch driving connection indicated in Figs. 1 and 3. The other member of this clutch is $c^2$ also shown in Fig. 2; $c^2$ when moved to the right engages the ends of $g^2$, central position gives neutral and movement to the left engages with corresponding dogs on the ring member $f$.

The gear wheel $b$ as shown is in constant mesh with gear wheel $k$ on the parallel layshaft $l$, on this shaft a wheel $m$ is cut, and dogs $m^2$ drive when so required a wheel $n$ in constant mesh with the wheel $i$. The shaft $l$ revolves freely in $n$ which can be moved endwise thereon and has dog clutches to correspond with dogs $o$ fixed on the casing, as well as to the dogs $m^2$. The sun-wheel $h$ is thus either driven or held stationary when required.

An idler wheel $p$ is slidable endwise on its bearing shaft and can engage $m$ and outer gear on the ring $f$ simultaneously, thus imparting from $l$ a backward revolution to $f$. In order to provide for holding the ring $f$ stationary, swinging dog or double pawl $q$ is provided and is made to function when the clutch member $c^2$ is in neutral.

Each member requiring movement as above must be actuated in a convenient manner by mechanical means and this will be described later, but the following combinations give four forward speeds and one reverse as follows:—

Fourth speed or direct drive, $c^2$ is moved to the right and engages the end of $g^2$, all other clutches being in neutral.

Third speed or first reduction, $c^2$ is moved to the left, driving the ring $f$ and the sun-wheel $h$ is held stationary by the wheel $n$ engaging the casing at $o$ securing a reduction of, for example, about 1.5 to 1.

Second speed or second reduction, the ring $f$ is held by the dogs $q$ whilst the sun-wheel is driven by moving $n$ to the left, securing a reduction of, for example, say 2.6 to 1.

First speed or third reduction, the sun-wheel is driven as above but instead of holding the ring member stationary it is rotated in a backward direction by introducing the idler wheel $p$ between $m$ and the external gearing on the ring member $f$. Thus a minus effect is produced and the sun-wheel drive is converted into an effective slow ratio of, for example, say 5 to 1.

Reverse is secured by utilizing the above described slow backward revolution of the ring member $f$ with the sun-wheel stationary, the clutch $o$ coming into action as for third speed, this results in the driven shaft $d$ revolving in a backward direction.

In a modified gear box according to the invention further or different gear ratios are obtained by varying the speed of the sun-wheel $h$ or by introducing an idler, similar to $p$ and which can be similarly brought into engagement either to rotate the sun-wheel backward or forward.

The speed of the sun-wheel can be varied, for example, by varying the ratios of the diameters of the two pairs of gears $b$, $k$, and $n$, $i$.

Figure 10:
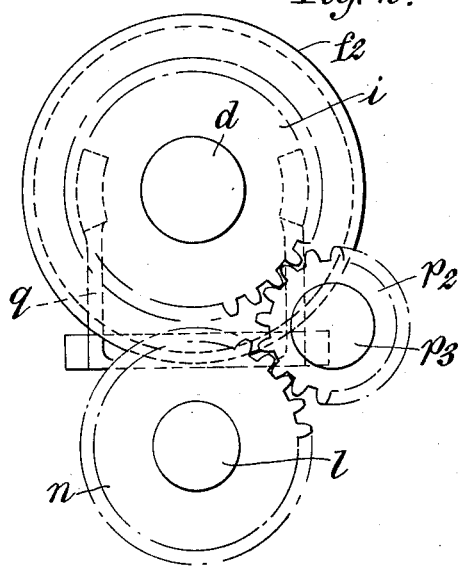
Fig. 10 is an end view of the same.

In order to drive the sun-wheel in a backward direction an arrangement of gears is provided as illustrated in Figs. 9 and 10. It will be noted that the arrangement shown in these two figures is very similar to that shown in Fig. 1 except that the external gear on the ring member $f^2$ and the teeth $m$ on the lay shaft have been omitted and the idler $p$ has been transposed to the position $p^2$ on a further shaft $p^3$. This gear $p^2$ acts as an idler between the wheel $i$ and the wheel $n$, the arrangement being such that the idler $p^2$ and the wheel $n$ are in constant mesh and both are capable of sliding together on their respective shafts $p^3$ and $l$, to engage or disengage with the gear $i$.

When the gears $i$, $p^2$ and $n$ are in mesh the gear $i$ will be driven in the same direction as the lay shaft and thus in a direction opposite to that of the driving shaft and thus when the ring member $f^2$ is driven forward a slow resultant ratio is obtained according to the gearing employed.

If the ring $f^2$ is held stationary by the dogs $q$, the shaft $d$ will be driven through the trains $b$, $k$, $n$, $p^2$, $i$ and $h$, and as the sun-wheel is rotated backwards the shaft $d$ will rotate in the same direction, thus obtaining by this arrangement a reverse drive.

In order to secure a driving connection from each end of the gear box the arrangement of the driving and driven shafts may be varied as shown dotted in Fig. 1. This variation may consist of an extension of the lay shaft $l$ to form a driver, indicated by $a^2$. Thus, through the constant mesh wheels $k$ and $b$ power is transmitted to the clutch member $c$ which can be actuated as before. In conjunction with such modification the driven shaft $d$ can be extended through $b$ as shown dotted at $d^3$ securing a drive as may be required, and the wheel $b$ must run freely on this extension.

The gear changes already described are brought about by the engagement and disengagement of various clutches whose movements can be secured separately by hand or by cams, but as an example, in connection with a four speed box, I provide a modified form of the usual central change hand lever universally pivoted at $r^3$, Fig. 1. In the gear described for all changes (except fourth or top speed) two part movements are required, therefore the end $r$ of the hand lever $r^2$ is made wide to take two notches in the actuating bars. Three bars are used, $s$ connected to the clutch member $c^2$, $t$ to the gear wheel $n$ through the centrally pivoted lever $t^2$, $v$ is a link universaly connected to the lever $r^2$, reference also Fig. 5, and connects through a lever $v^3$, a small shaft $v^2$ with part bevel $v^4$ at its lower end as shown in Fig. 4 and which engages with another part bevel $v^5$ to partially rotate the horizontal shaft $w$ and lever $w^2$ sliding the idler $p$ itno and out of engagement. The double pawl $q$ is free on the shaft $w$ and engages the dogs formed on $f$ by a swinging motion, the extension $q^2$ being jointed to the bar $u$.

Figure 6:
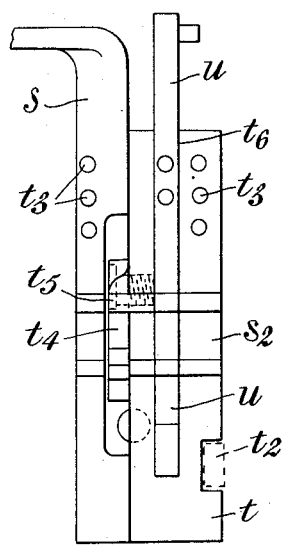
Figure 7:
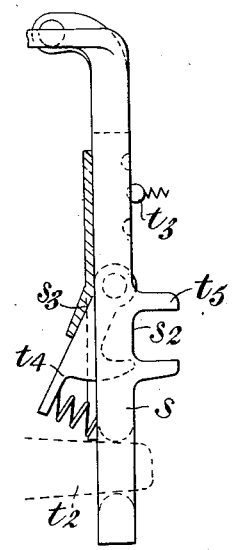

Figs. 6 and 7 show the sliding bars $s$, $t$ and $u$, each of which has a notch $s^2$ and the lower end $r$ of the hand lever $r^2$ engages the bars herein. The bar $t$ is slotted longitudinally as at $t^6$ to receive bar $u$, and on the side nearest the bar $s$ the notch $s^2$ is one-sided as at $t^5$, which side with a hook $t^4$ attached to the bar $t$ projects half way across bar $s$. The function of $t$ is to engage through the swinging lever $t^2$ the gear wheel $n$, and the engagement of $s$ controls the clutch member $c^2$. A cam plate on the guide $s^3$ raises the hook $t^4$ on the forward movement of the bar $t$ and carries this bar to neutral position. $t^3$ is the usual bar retainer.

Fig. 8 indicates the movements of the lower end $r$ of the hand lever $r^2$. It has three definite positions $x$, $y$ and $z$ at neutral. The passage from $x$ to $z$ is clear when the notches are central, the movement $x$ to $y$ is a dead movement and $y$ to $z$ moves the idler $p$, through the medium of the linkage already described, into mesh with the gear wheel $m$ and ring $f$.

Fourth speed is secured by movement of the lever from $x$ to 4 on which movement bar $s$ only is moved. For third speed the lever is returned to neutral position $x$ and moved over to 3, this movement causes bar $s$ to move clutch member $c^2$ into engagement with the ring member $f$. At the same time the end $r$ of the lever $r^2$ will also engage the side $t^5$ of the slot of the bar $t$ and carry this over, thus moving wheel $n$ into engagement with the casing. For second speed the lever is first returned to $x$, thus carrying the bars $s$, and through the agency of the hook $t^4$, the bar $t$ to neutral; $r^2$ is then free to move to position $y$ and finally to position 2. This movement actuates bars $t$ and $u$ and secures the combination for this speed. For first speed the lever is returned to $y$ and moved over to $z$ which movement brings the idler $p$ into engagement, and $z$ to $l$ secures the necessary combination for first speed. Reverse is secured by movement of the lever back to $z$, and then to the reverse position.

It is to be understood that the invention is not to be confined to the foregoing details of construction which are given by way of example only, nor to the particular application given for the purpose of illustration since the invention may be applied to change speed gears required for purposes other than for use upon self-propelled vehicles, and may be variously modified to suit the purpose for which the gear is required or practical requirements that may have to be fulfilled.

Having now described my invention what I claim as new and desire to secure by Letters Patent is:—

1. A change speed gear comprising in combination, a driving shaft, a driven shaft, an epicyclic gear train having a sun and planet wheels and an outer gear ring, clutch means for alternatively connecting the driving shaft directly with the driven shaft or indirectly thereto through the outer gear ring, a lay shaft rotated by the driving shaft, means on the lay shaft for imparting rotation alternatively to the said gear ring or to the sun wheel, and means associated with said lay shaft for holding said sun wheel stationary.

2. A change speed gear comprising in combination, a driving shaft, a driven shaft, an epicyclic gear train having a sun and planet wheels and an outer gear ring, clutch means for alternatively connecting the driving shaft directly with the driven shaft or indirectly thereto through the outer gear ring, a lay shaft rotated by the driving shaft, means on the lay shaft for imparting rotation alternatively to the said gear ring or to the sun wheel, and means associated with said lay shaft for holding said sun wheel stationary, and means for holding said gear ring stationary.

3. A change speed gear having in combination, a driving shaft, a driven shaft having a flange thereon, an epicyclic gear train comprising a sun wheel loosely mounted on the driven shaft and planet wheels carried by said flange, and an outer gear ring engaging with the planet wheels, clutch means for alternatively connecting the driving shaft directly with the driven shaft or indirectly thereto through the said outer gear ring, a lay shaft continuously rotated by the driving shaft, means on said lay shaft for imparting rotation alternatively to the said outer gear ring or to the sun wheel, clutch means associated with said lay shaft for holding the sun wheel stationary, and clutch means for holding said outer gear ring stationary.

4. A change speed gear having in combination, a driving shaft, a driven shaft and having a flange thereon, an epicyclic gear train comprising a sun wheel loosely mounted on the driven shaft and having another gear wheel formed therewith, planet wheels carried by said flange, an outer gear ring engaging with said planet wheels, clutch means for alternatively connecting the driving shaft to said flange member or to said outer gear ring, or to occupy a neutral position, a lay shaft continuously rotated by the driving shaft, a second gear wheel loosely mounted on the lay shaft and constantly in mesh with the said gear wheel formed with the sun wheel, clutch means associated with the lay shaft for alternatively connecting said second gear wheel to the lay shaft, or to the fixed casing of the gear, or to occupy a neutral position.

5. A change speed gear having in combination, a driving shaft, a driven shaft having a flange thereon, an epicyclic gear train, including a sun wheel loosely mounted on the driven shaft and having another gear wheel formed therewith, and planet wheels carried by said flange, an outer gear ring engaging internally with the planet wheels and having gear teeth on its exterior, clutch means slidably mounted on the driving shaft for alternatively connecting the driving shaft direct to the driven shaft, or to the outer gear ring, or to occupy a neutral position, a lay shaft continuously rotated by the driving shaft and having gear teeth formed thereon, an idler gear wheel adapted for engagement or disengagement with the said gear teeth on the lay shaft and the external gear teeth on the gear ring, a gear wheel loosely mounted on the lay shaft and constantly in mesh with the said other gear wheel formed with the sun wheel, clutch means for alternatively transmitting drive from the lay shaft to said sun wheel or for holding said sun wheel stationary.

6. A change speed gear according to claim 3 having a hand control mechanism comprising a universal pivoted hand lever, a series of parallel bars adapted to be actuated by said hand lever so as to actuate said clutch means, said bars being arranged so as to give simultaneous longitudinal movement of two bars, while a sideways movement of the hand lever gives a selecting position as regards the bars and also acts upon the auxiliary gear wheel employed for the first speed and reverse.

JOHN HENRY CHAMBERS.